United States Patent [19]

Fuss

[11] Patent Number: 5,678,088
[45] Date of Patent: Oct. 14, 1997

[54] METHOD FOR ADVANCING PHOTOGRAPHIC FILM FOR INTERSPERSING MONO AND DUAL IMAGES

[75] Inventor: Timothy John Fuss, Rochester, N.Y.

[73] Assignee: Eastman Kodak Company, Rochester, N.Y.

[21] Appl. No.: 570,168

[22] Filed: Dec. 7, 1995

Related U.S. Application Data

[60] Provisional application No. 60/003,074 Aug. 31, 1995.
[51] Int. Cl.⁶ .......................... G02B 27/22; G03B 35/10
[52] U.S. Cl. ..................... 396/323; 396/326; 396/333; 359/469
[58] Field of Search ........................ 396/322, 323, 396/324, 333, 326; 359/462, 466, 467, 468, 469

[56] References Cited

U.S. PATENT DOCUMENTS

| 347,451 | 8/1886 | Varing | 396/323 |
|---|---|---|---|
| 2,541,555 | 2/1951 | Sorkin | 396/323 |
| 2,725,804 | 12/1955 | Herzfeld | 396/323 |
| 3,850,505 | 11/1974 | Ratliff, Jr. | 359/466 |
| 4,491,434 | 1/1985 | Barr et al. | 396/323 |
| 5,294,951 | 3/1994 | Lo | 396/323 |
| 5,349,403 | 9/1994 | Lo | 396/324 |
| 5,361,108 | 11/1994 | Kamata et al. | 396/333 |

OTHER PUBLICATIONS

Japanese Patent Abstract 5–165123, Stereoscopic Camera, Kazuo Kamata, Jun. 29, 1993.

Japanese Patent Abstract 5–165124, Stereoscopic Camera, Kazuo Kamata, Jun. 29, 1993.

Japanese Patent Abstract 4–338940, StereoCamera And Its Processor, Takeshi Inagaki, Nov. 26, 1992.

Japanese Patent Abstract 5–19387, Stereoscopic Vision Printed Photograph Producing Method and Camera, Shunkichi Igarashi, Jan. 29, 1993.

Japanese Patent Abstract 5–19389, Stereoscopic Camera, Katsuji Muramatsu, Jan. 29, 1993.

Japanese Patent Abstract 5–173264, Stereo Camera, Kazuo Kamata, Jul. 13, 1993.

Japanese Patent Abstract 5–173265, Stereo Camera, Katsuji Muramatsu, Jul. 13, 1993.

Japanese Patent Abstract 5–188496, Stereoscopic Photography Camera, Teruo Suzuki, Jul. 30, 1993.

(List continued on next page.)

*Primary Examiner*—Safet Metjahic
*Assistant Examiner*—J. K. Han
*Attorney, Agent, or Firm*—Charles E. Snee, III; David A. Howley

[57] ABSTRACT

In accordance with the present invention, a method for advancing photographic film is provided for use by a photographic system which uses film cartridges, such as cameras, film development equipment or equipment which provides for the viewing and/or printing of processed film contained within a film cartridge. The method can be used by a dual lens camera to intersperse on photographic film mono and dual exposures and thereby minimize the possibility of double exposures and/or film waste. The method according to the present invention is for use by the camera to advance the film after each exposure action to align unexposed frames of film with each lens. In accordance with one embodiment of the present invention, the dual lens camera is capable of tracking whether the next frame has been exposed and the frame following the next frame has been exposed and advancing the film one frame if the next frame is unexposed; two frames if next frame is exposed and the frame following the next frame is unexposed; and three frames if the next frame is exposed and the frame following the next frame is exposed. The method of the present invention can also be used by a hand-held viewer capable of displaying images on processed film containing interspersed mono and dual images to advance the processed film to minimize the possibility of the viewer displaying such images in duplicity.

10 Claims, 10 Drawing Sheets

OTHER PUBLICATIONS

Japanese Patent Abstract 5–188497, Stereoscopic Photography Camera, Teruo Suzuki, Jul. 30, 1993.

Japanese Patent Abstract 5–188498, Formation Of Synthesized Image by Stereoscopic Photography Camera and Method for Sticking Lenticular Plate For Stereoscopic Photography, Tsutomu Yoshida, Jul. 30, 1993.

Japanese Patent Abstract 5–188499, Method For Sticking Lenticular Lens for Stereoscopic Photography, Tsutomu Yoshida, Jul. 30, 1993.

Japanese Patent Abstract 5–188500, Stereoscopic Photography Camera, Tsutomu Yoshida, Jul. 30, 1993.

Japanese Patent Abstract 5–188557, Stereoscopic Photography Camera, Senhiko Yamada, Jul. 30, 1993.

METHOD FOR ADVANCING PHOTOGRAPHIC FILM FOR INTERSPERSING MONO AND DUAL IMAGES

CROSS REFERENCE TO RELATED APPLICATION

Reference is made to and priority claimed from U.S. Provisional Application Serial No. US 60/003,074, filed 31 Aug. 1995, abandoned, entitled A METHOD FOR ADVANCING PHOTOGRAPHIC FILM FOR INTERSPERSING MONO AND DUAL IMAGES.

FIELD OF THE INVENTION

The present invention relates to the field of photographic systems, and more specifically, to a photographic system capable of recording, and/or allowing for the viewing of, mono and dual images interspersed on photographic film.

BACKGROUND OF THE INVENTION

Photographic cameras are known which are capable of producing stereo and mono photographs. For example, U.S. Pat. No. 2,725,804 by Herzfeld, issued Dec. 6, 1955, discloses a stereo camera attachment that enables a dual lens camera to be used for both producing mono images and stereo pair images. The Herzfeld camera positions the film such that two side-by-side frames are aligned with each lens. When used in the stereo mode, the Herzfeld camera exposes the side-by-side frames simultaneously. In order to use the Herzfeld camera in the mono mode, a user must cap one of the lenses and, consequently, only the frame aligned with the uncapped lens is exposed. To avoid wasting film, a user can move the lens cap to the other lens and expose the frame aligned with the uncapped lens. Following the second mono exposure, the film is wound to bring a new pair of side-by-side unexposed frames into alignment with each lens. The camera attachment disclosed by U.S. Pat. No. 2,725,804 by Herzfeld is intended to prevent wasting film or committing double exposures by manually assisting a user in tracking whether the frames aligned with the lenses have been exposed.

The camera and camera attachment disclosed by Herzfeld create several disadvantages. First, in order to avoid film waste, a second mono exposure must immediately follow a first mono exposure before a stereo exposure can occur. As a consequence, the Herzfeld camera cannot intersperse a single mono image among stereo images without film waste. Second, the camera disclosed requires a user to perform specific operations in order to intersperse mono and stereo images on the film. Thus, despite the attachment disclosed by Herzfeld, the possibility still remains that a user will inadvertently double expose one frame of a stereo pair of images or waste film by advancing the film following a single mono exposure in order to take a stereo exposure.

Consequently, it would be advantageous to eliminate the need for two back-to-back mono exposures to occur to avoid wasting film. It would be desirable to provide a photographic system which automatically intersperses mono and dual images. It would be advantageous to provide a photographic system which minimizes the possibility of double exposures. It would be desirable to provide a photographic system which minimizes film waste. It would be advantageous to provide a photographic system which is capable of producing dual images, exposed either simultaneously or separately with a time delay between exposures. It would be desirable to provide a photographic system capable of viewing mono and dual images on processed film.

SUMMARY OF THE INVENTION

In accordance with the present invention, a method for advancing photographic film is provided for use by a photographic system which uses film cartridges, such as cameras, film development equipment or equipment which provides for the viewing and/or printing of processed film contained within a film cartridge. The method can be used by a dual lens camera to intersperse on photographic film mono and dual exposures and thereby minimize the possibility of double exposures and/or film waste. The method can also be used by a hand-held viewer capable of displaying images on processed film containing interspersed mono and dual images to advance the processed film to minimize the possibility of the viewer displaying such images in duplicity. Preferably, the method is used by a photographic system capable of accepting thrust film cartridges.

In accordance with one embodiment of the present invention, the method is for use by a photographic system comprising a dual lens camera. Film is positioned within the camera such that when frames of film are aligned with each lens of the camera and said frames are separated by a single frame. The camera is capable of exposing two frames simultaneously or separately, or a single frame. The method according to the present invention is for use by the camera to advance the film after each exposure action to align unexposed frames of film with each lens. Consequently, a frame which has been exposed, will not be re-exposed. Further, a user will have the option of selecting dual exposures or a single exposure after each exposure action.

In accordance with another embodiment of the present invention, the dual lens camera is capable of tracking the exposure condition of the next frame and the frame following the next frame. The method of the present invention is for use by the camera to advance the film after an exposure action occurs such that unexposed frames of film are aligned with each lens of the camera. In this regard, the film is advanced one frame if the next frame is unexposed; two frames if the next frame is exposed and the frame following the next frame is unexposed; and three frames if the next frame and the frame following the next frame are both exposed.

In accordance with another embodiment of the present invention, the method is for use by a photographic system comprising a film viewer having two viewing lenses. Processed film containing interspersed mono and stereo images (burst images are considered mono images for purposes of the viewer) is positioned within the viewer such that when frames of film are aligned with each viewing lens of the viewer and said frames are separated by a single frame. The viewer is capable of displaying stereo images through each viewing lens or mono image through a one of the viewing lenses. The method according to the present invention is for use by the viewer to advance the film after each viewing action to align and display the next image through the viewing lenses, regardless of whether the next image is a mono or stereo image. Consequently, an image which has been displayed, will not be redisplayed. Further, a user of the viewer will be able to view the next image on the film regardless of whether the image is a mono or stereo image.

In accordance with another embodiment of the present invention, the viewer is capable of tracking whether the image previously displayed was a stereo image and whether the image being presently displayed is a stereo image. The method of the present invention is for use by the viewer to advance the film after a viewing action occurs such that the next unviewed image is aligned with each viewing lens. In this regard, the film is advanced one frame if the image on the next frame has not been displayed; two frames if the image on the next frame has been displayed and the image on the frame following the next frame has not been displayed; and three frames if the images on the next frame and the frame following the next frame have been both previously displayed.

DETAILED DESCRIPTION

A method according to the present invention is for use as part of any photographic system capable of accepting film cartridges, such as cameras, film development equipment and equipment which provides for the viewing and/or printing of processed film contained within a film cartridge, including for example, hand-held film viewers. For example, the method can used by a dual lens camera, capable of producing mono and dual images, to intersperse mono and dual images, eliminate the possibility of double exposures and/or minimize film waste. By way of further example, the method can be used by a hand-held viewer to advance processed film containing interspersed mono and dual images. Preferably, the method is used by a photographic system capable of accepting thrust film cartridges.

Figure 2:
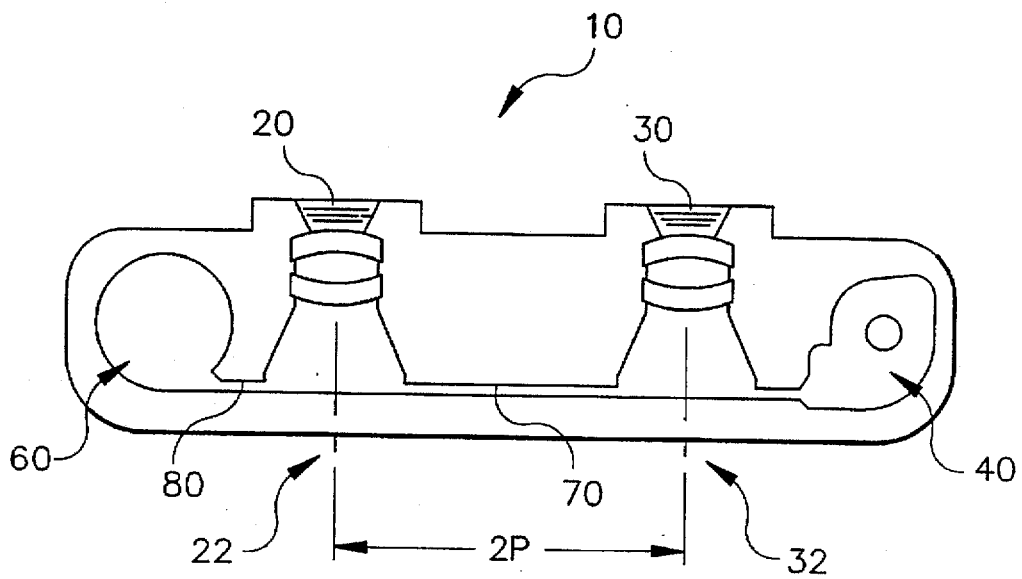
FIG. 2 is a top view of a photographic system in which the control process shown in FIG. 1 is used.
Figure 3:
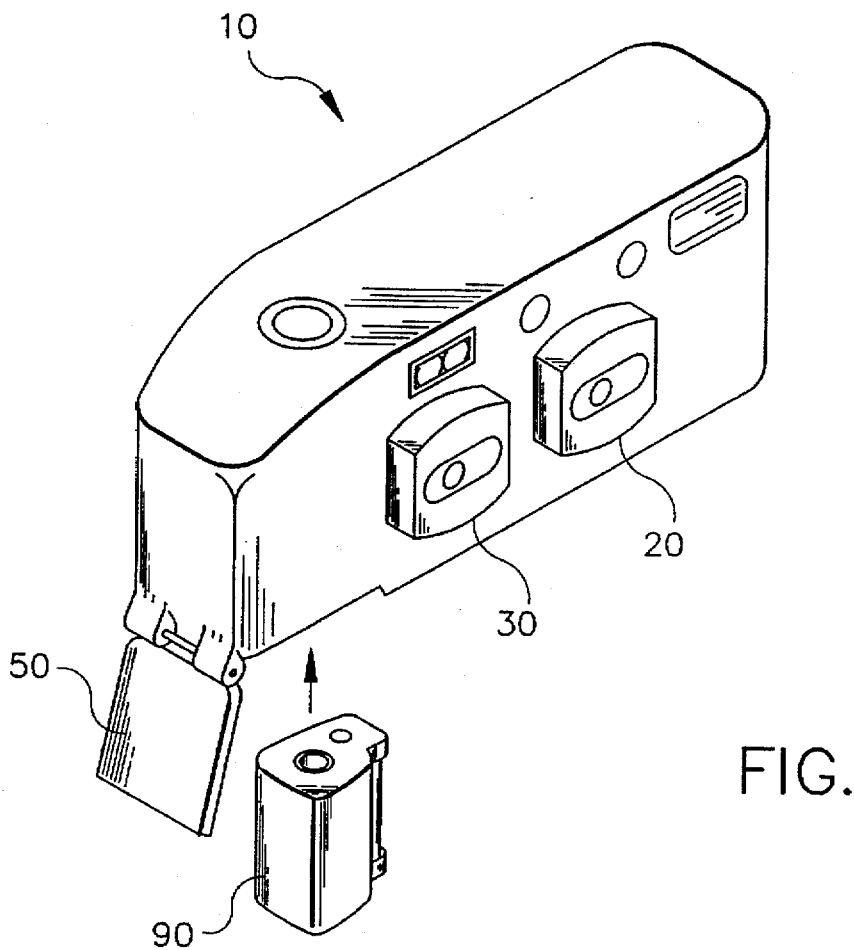
FIG. 3 is a perspective view of the photographic system shown in FIG. 3.

A dual lens photographic system 10, such as shown in FIGS. 2 and 3, is capable of operating in several modes, including a mono mode, stereo mode or burst mode. A user interface (not shown) can be provided on the exterior of the photographic system 10 to allow a user to select the photographic system's 10 operating mode. When operating in the mono mode, the photographic system 10 executes a single exposure. When operating in either the stereo or burst modes, the photographic system 10 executes dual exposures.

As shown in FIGS. 2 and 3, the photographic system 10 includes a primary lens 20, a primary shutter (not shown), a secondary lens 30 and a secondary shutter (not shown). The photographic system 10 also includes a device (e.g. a shutter release button) (not shown) for activating an exposure action. If a user activates an exposure action in the mono mode, only the primary shutter is actuated. If a user activates an exposure action in either the stereo or burst modes, both the primary shutter and secondary shutter are actuated. In the stereo mode, the primary and secondary shutters are actuated simultaneously. In the burst mode, the primary and secondary shutters are actuated one after the other, separated temporally by a predetermined time delay, which can be user controlled. It should be appreciated that the time delay between exposures is not limited by advancement of the film and, consequently, there is no minimum time delay. It should be noted that a minimum time delay could occur if the ambient light level is low enough to require use of a flash unit. However, known flash units can be used to strobe or provide two rapid flashes with little time delay.

Figure 1A:
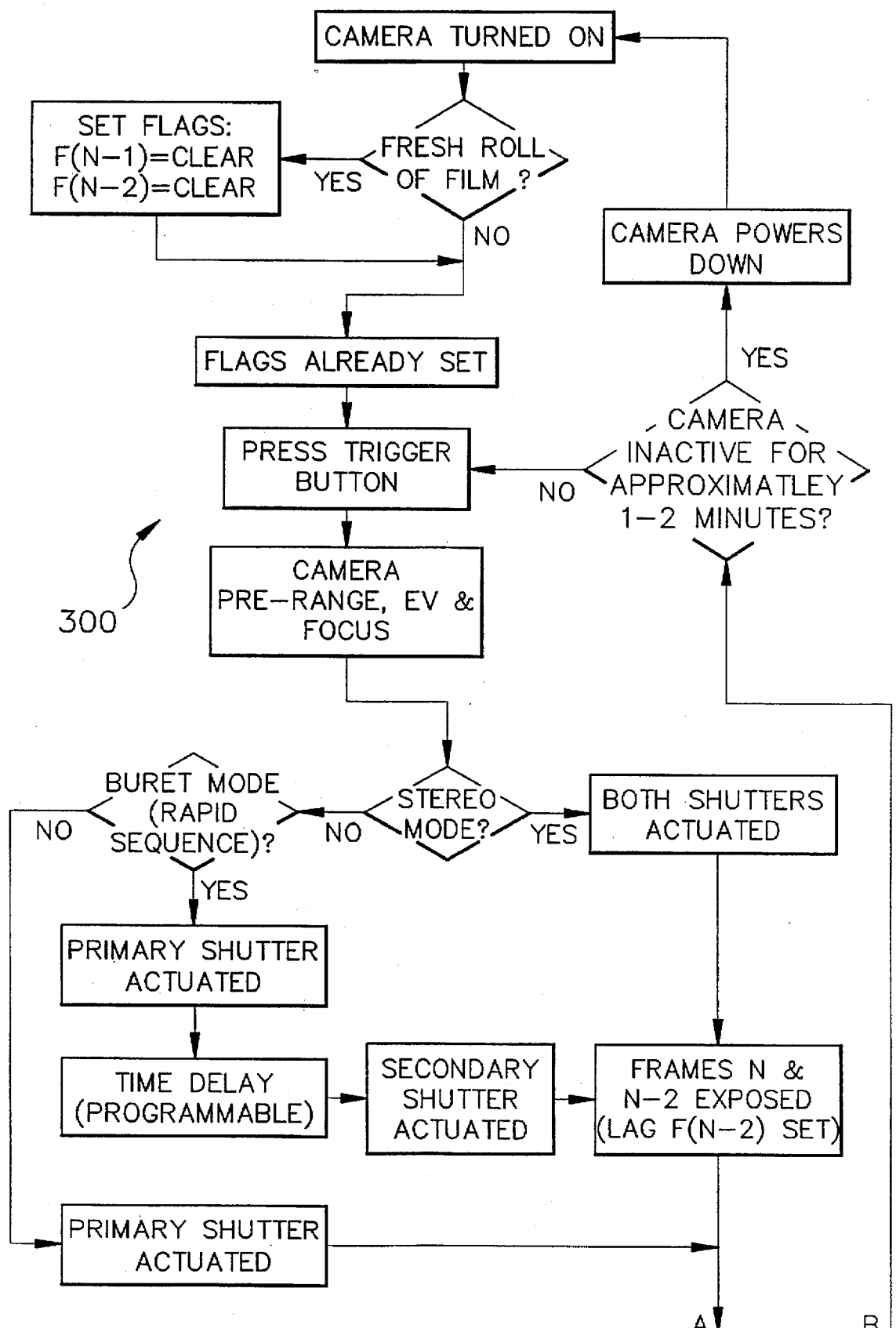
FIGS. 1A and 1B are block diagrams describing the method according to the present invention as a control process for use by a dual lens camera.
Figure 1B:
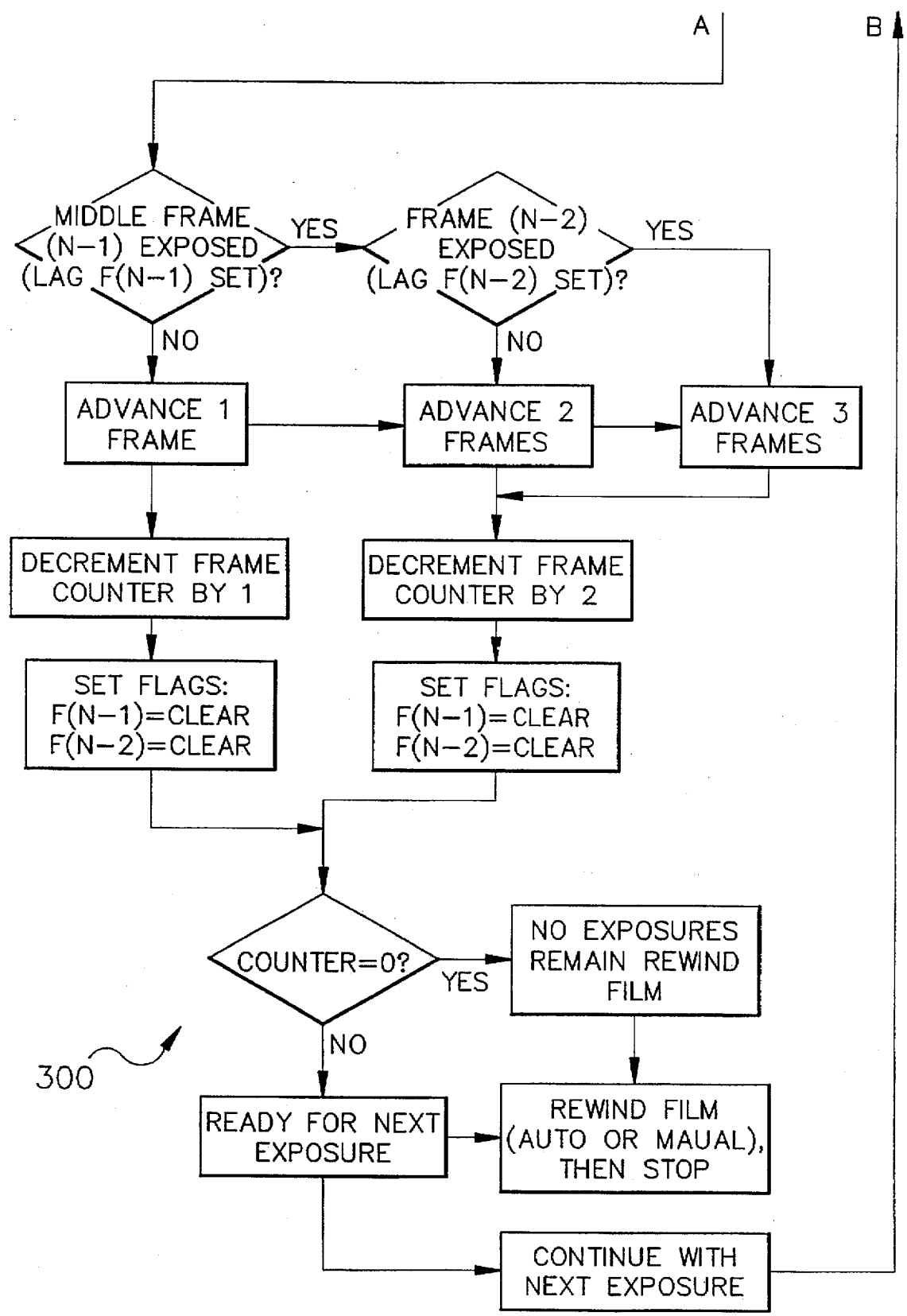

As shown in FIGS. 1 and 2, the photographic system 10 also includes a loading chamber 40, a film door 50, a film take-up chamber 60, a film exposure gate 70 and a magnetic recording head 80. The loading chamber 40 is capable of receiving a film cartridge 90 end-wise, i.e. axially, through the opening of the loading chamber 40. The film door 50 is moveable between opened and closed positions for uncovering and covering the opening of the loading chamber 40. The film cartridge 90 is loaded into the photographic system 10 by inserting the film cartridge 90 into the loading chamber 40 and closing the film door 50. Upon closing the film door 50, the film (not shown) contained within the film cartridge 90 can be advanced from the film cartridge 90, across the film exposure gate 70, and into the film take-up chamber 60. Advancement of the film can occur automatically upon closing of the film door 50 or in response to a user's command.

It should be appreciated that the photographic system 10 is shown in FIGS. 2 and 3 as a normal wind photographic system wherein the film is advanced from the loading chamber 40 to the film take-up chamber 60 sequentially after each exposure action. In the circumstance the photographic system 10 is a prewind photographic system (wherein the film is prewound from the loading chamber 40 to the film take-up chamber 60 prior to any exposure, and then rewound back to the loading chamber 40 sequentially after each exposure action), it is preferable that the primary lens 10 be the lens closest to the loading chamber 40.

Figure 4:
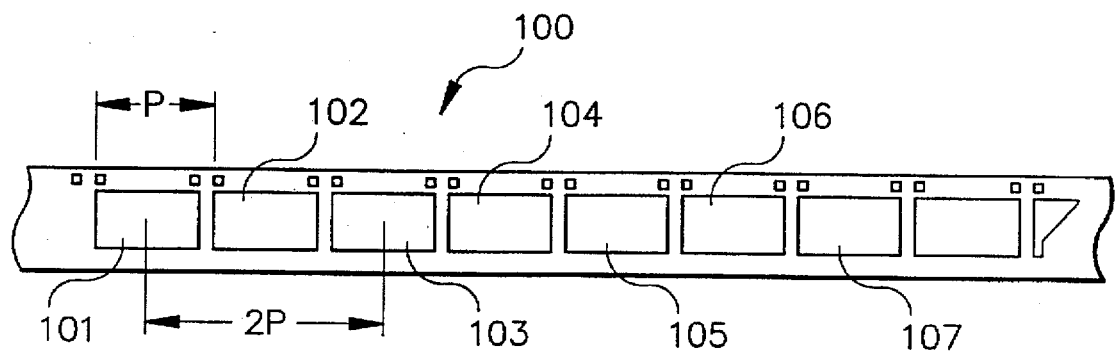
FIG. 4 is a view of frames on a strip of film.

With reference to FIGS. 2–4, when the film 100 is positioned ready for an exposure action, the film 100 extends from the film cartridge 90 across the film exposure gate 70 and is wound about the take-up spool (not shown) in the take-up spool chamber 60. Generally, a distance P separates each frame on the film 100, and on the other hand, the center focal line 22 of the primary lens 20 and the center focal line 32 of the secondary lens 30 are spaced a distance 2P. Thus, when the film 100 is exposure ready, a frame 101 of the film 100 is aligned with the primary lens 20 and a frame 103 is aligned with the secondary lens 30.

The photographic system 10 is capable of advancing the film 100 to automatically intersperse mono and dual exposures without double exposures or film waste. For example, when the film 100 is newly loaded and the frame 101 constitutes the first frame of the film 100 and the frame 103 constitutes the third frame of the film 100, either a mono or dual exposure can occur. In the event a mono exposure occurs, the frame 101 is exposed to the image projected by the primary lens 20 when the primary shutter (not shown) is actuated. In the event a dual exposure occurs, the frame 101 is exposed to the image projected by the primary lens 20 when the primary shutter (not shown) is actuated and the frame 103 is exposed to the image projected by the secondary lens 20 when the secondary shutter (not shown) is actuated.

Regardless of whether a mono or dual exposure occurs, the film 100 is advanced one frame and, as a result, the frame 102 is aligned with the primary lens 20 and the frame 104 is aligned with the secondary lens 30. It should be noted that the frame 102 and frame 104 are unexposed, and as a consequence, either a mono exposure or dual exposure can next occur independent of whether the previous exposure action was a mono or dual exposure.

Following the first exposure action, the film 100 is advanced according to the exposure condition of the next frame and the frame following the next frame. For example, if the first exposure action was a mono exposure and the second exposure action is another mono exposure, only the frame 102 will be exposed and the film 100 is advanced one frame to align the next unexposed frame, i.e., frame 103, with the primary lens 20. If the first exposure action was a mono exposure and the second exposure is a dual exposure, the frame 102 and the frame 104 will be exposed. Again, the film 100 is advanced only one frame to align the next unexposed frame, i.e., frame 103, with the primary lens 20. If the first exposure action was a dual exposure and the second exposure action is a mono exposure action, the frame 103 will be exposed and the film 100 is advanced two frames to align the next unexposed frame, i.e., frame 104, with the primary lens 20. If the first exposure action was a dual exposure and the second exposure action is another dual exposure, the frame 103 and the frame 105 will be exposed and the film 100 is advanced three frames to align the next unexposed frame, i.e., frame 106, with the primary lens 20. Again, it should be noted that whenever the film 100 is advanced, unexposed frames are aligned with the primary lens 20 and the secondary lens 30. Consequently, a user of the photographic system 10 can initiate either a mono or dual exposure independent of whether the previous exposure action was a mono or dual exposure.

Generally, the film 100 will be advanced one frame regardless of whether the present exposure action is a mono or dual exposure when the next frame is unexposed. If the next frame has been previously exposed, the film 100 will be advanced either two frames or three frames depending on whether the present exposure action is a mono or dual exposure. For example, if the present exposure action is a mono exposure, the frame following the next frame is unexposed and, the film 100 is advanced two frames to align the next unexposed frame, with the primary lens 20. If the present exposure action is dual exposure, the frame following the next frame is exposed and the film 100 is advanced three frames to align the next unexposed frame, with the primary lens 20.

Figure 5:
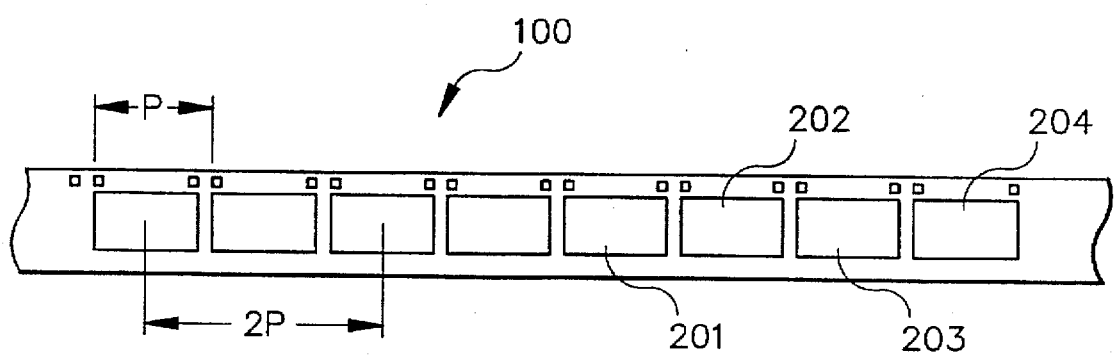
FIG. 5 is a view of frames on the film showing the end of the film.

A user of the photographic system 10 may be limited to at most two consecutive mono exposure actions to avoid film waste when the film 100 reaches the end, the film 100 reaches its end. With reference to FIG. 5, when the film 100 is positioned such that frame 202 (the third to last frame) is aligned with the primary lens 20. In this position, a user still has the option of either a mono or dual exposure. For example, the frame 203 (the second to last frame) is unexposed and a mono exposure occurs, the film 100 is advanced one frame and the frame 203 is aligned with the primary lens 20. Thus, a user will be limited to two consecutive mono exposures for frames 203 and 204 (the last frame) to avoid film waste. Alternatively, if the frame 203 is unexposed and a dual exposure occurs, the film 100 is advanced one frame and the frame 203 is aligned with the primary lens 20 and a user is limited to single mono exposure for frame 203 to avoid film waste. Finally, if the frame 203 has been previously exposed and a mono exposure occurs, the film 100 is advanced two frames and the frame 204 is aligned with the primary lens 20 and a user will be limited to a single mono exposure for frame 204 to avoid film waste.

A method according to the present invention for use with the photographic system 10 to automatically intersperse mono and dual exposures without double exposures or film waste is shown as a process 300 in FIG. 1. Preferably, the process is implemented by the photographic system 10 by the use of a programmable controller or microprocessor known to those skilled in the art. Preferably, the photographic system 10 is capable of storing and maintaining information concerning certain variables (flags, frame count, etc.) when the photographic system 10 is turned off and on.

The process 300 tracks the exposure status of the next frame, designated by the flag f(n−1), and the frame following the next frame, designated by a flag f(n−2). For example, with reference to FIG. 4, when the frame 101 is aligned with the primary lens 20, the flag f(n−1) represents the exposure status of frame 102 and the flag f(n−2) represents the exposure status of frame 103. Based on whether f(n−1) and/or f(n−2) are set (e.g., assigned a value of one), the film 100 is advanced either one, two or three frames.

The process 300 can be initiated when the photographic system 10 is turned on. Upon initiation, the values of the flags f(n−1) and f(n−2) are determined. If the film 100 is newly loaded, it is presumed that none of the frames of the film 100 have been exposed and the flags f(n−1) and f(n−2) are cleared (e.g., assigned a value of zero). For example, loading of a film cartridge 90 can occur by opening the film door 50, inserting the film cartridge 90 and closing the film door 50. Advancement of the film 100 from the film cartridge 90 into the film exposure gate 70 can occur by turning on the photograph system 10 and activating a shutter release button (not shown). In this circumstance, the flags f(n−1) and f(n−2) can be cleared upon the opening of the film door 50 or the initial advancement of the film 100 from the film cartridge 90. If the film 100 was previously exposed, the values of the flags f(n−1) and f(n−2) are the same as they were prior to the photographic system 10 being previously turned off. Additionally, upon initiation, the remaining frame count for unexposed frames is determined and compared to zero. If zero, no unexposed frames remain and the photographic system waits for a user command to rewind the film 100 into the film cartridge 90.

Next, the photographic system 10 is ready for a user to initiate an exposure action. If a dual exposure occurs, the primary shutter (not shown) and the secondary shutter (not shown) are actuated either simultaneously (stereo) or separately with a time delay (burst) and the flag f(n−2) is set. The setting of flag f(n−2) indicates the frame aligned with the secondary lens 30 was exposed. Alternatively, if a mono exposure occurs, only the primary shutter 22 is actuated and the value of the flags f(n−1) and f(n−2) are not changed because neither the next frame or the frame following the next frame, i.e. the frame aligned with the secondary lens 30, are exposed as a result of the mono exposure action. Regardless of whether a mono or dual exposure occurred, the value of the flag f(n−1) is next determined. If the flag f(n−1) is not set, the next frame is presumed unexposed and the film 100 is advanced one frame to align the next unexposed frame with the primary lens 20 and to align unexposed frame with the secondary lens 30. Additionally, the frame counter is decreased by one, the flag f(n−1) is assigned the value of flag f(n−2) and flag f(n−2) is cleared.

Alternatively, if the flag f(n−1) is set, the next frame is presumed exposed, the exposure status of the frame following the next frame, i.e., flag f(n−2), is next determined. If the flag f(n−2) is not set, the frame following the next frame is presumed unexposed and the film 100 is advanced two frames to align the next unexposed frame with the primary lens 20 and unexposed frame with the secondary lens 30. Additionally, the frame counter is decreased by two and the flags f(n−1) and f(n−2) are cleared. Finally, if the flag f(n−2) is set, the frame following the next frame is presumed exposed and the film 100 is advanced three frames to align the next unexposed frame with the primary lens 20 and unexposed frame with the secondary lens 30. Additionally, the frame counter is decreased by three and the flags f(n−1) and f(n−2) are cleared.

In all circumstances, the new frame count is next compared to zero. If the new frame count is zero, it is presumed that no unexposed frames exist and photograph system 10 awaits a user command to rewind the film 100. If the frame count is nonzero, the photographic system 10 is ready for another exposure action.

Figure 6A:
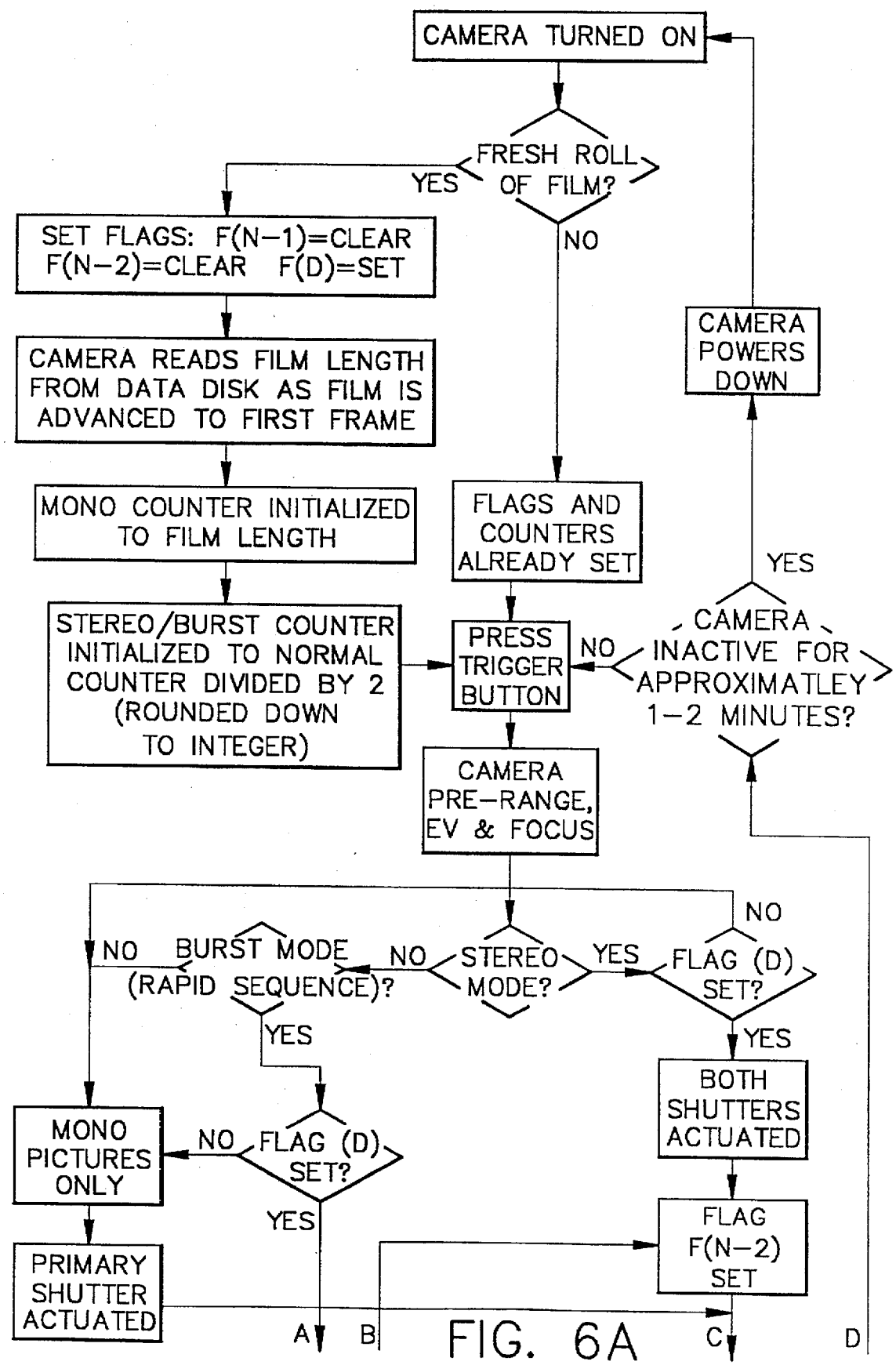
FIGS. 6A, 6B and 6C are the control processes shown in FIGS. 1A and 1B, modified to inhibit dual exposure actions when no unexposed frame is aligned with the secondary lens.
Figure 6B:
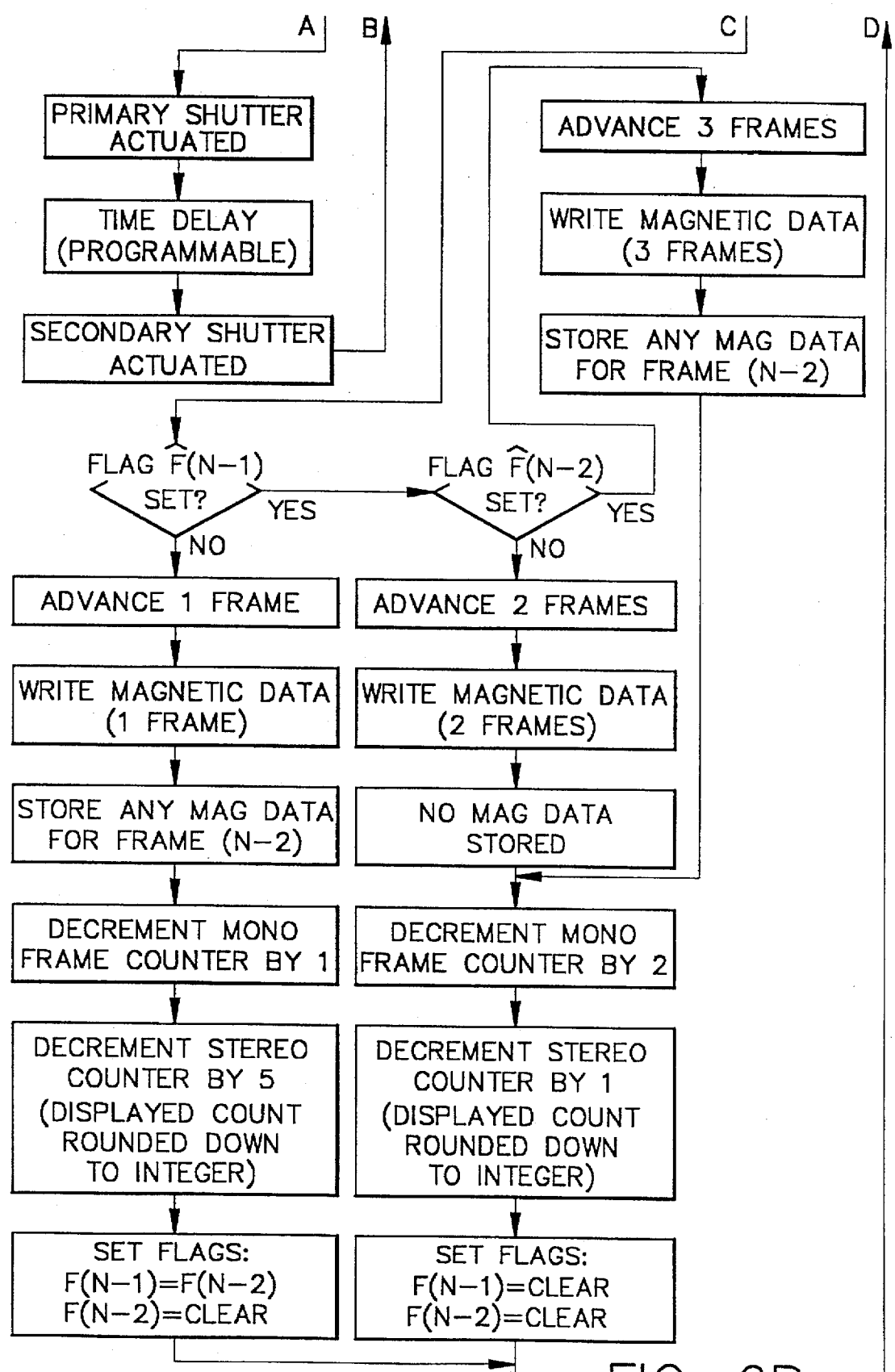
Figure 6C:
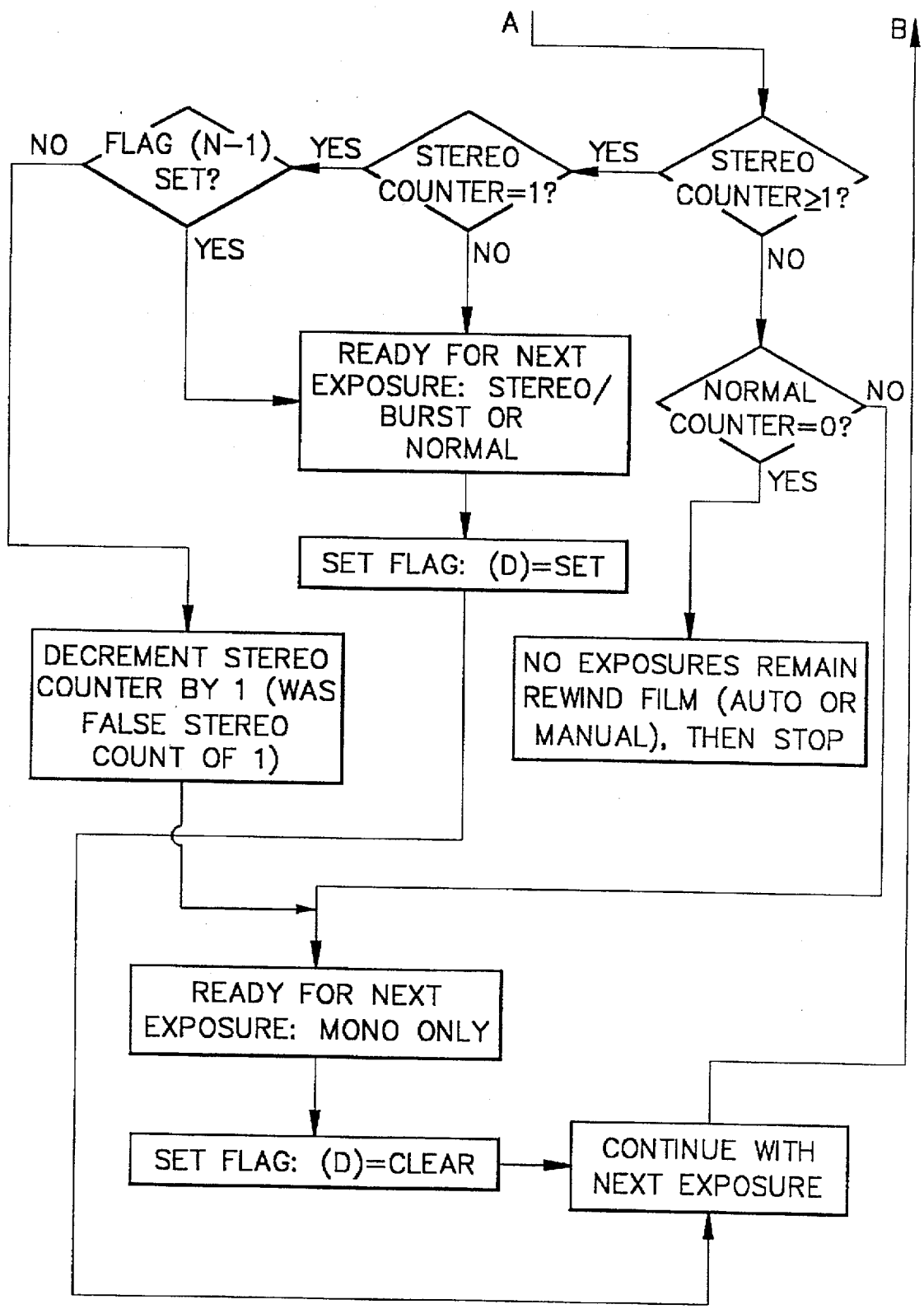

As discussed above, the only circumstance where the user will be limited to a mono exposure is when the film 100 reaches its end and an insufficient number of unexposed frames remain. As shown in FIG. 6, the process 300 can be modified to inhibit a dual exposure action when an unexposed frame is not aligned with the secondary lens 30. In this regard, the number of unexposed frames on the film 100 is tracked by two counters, a normal counter to track the number of mono exposures remaining and a dual exposure counter to track the number of dual exposures remaining. For example and with reference to FIG. 6, when the film 100 is initially loaded, the normal exposure counter can be initialized to number of unexposed frames on the film 100 and the dual exposure counter can be initialized to the value of the normal exposure counter divided by two. When a mono exposure occurs, the normal exposure counter is decreased by one and the dual exposure count is decreased by ½. When a dual exposure occurs, the normal exposure counter is decreased by two and the dual exposure count is decrease by one. In this regard, the normal exposure counter and the dual exposure counter can be displayed by the photographic system 10 to give a user a visual indication after each exposure action of the number of mono and dual exposures possible in view of the remaining unexposed frames of film 100.

In order to determine if an unexposed frame of film 100 is aligned with the secondary lens 30, a flag D can be tracked. For example, if the flag D is cleared, it is presumed that no unexposed frame is aligned with the secondary lens 30 and a dual exposure action is inhibited. The flag D is set upon initial loading of the film 100 because it is presumed that an unexposed frame is aligned with the secondary lens 30 when the film is first loaded. The flag D is cleared in two circumstances. First, when the dual exposure counter is less than one and the normal exposure counter indicates an unexposed frame exists for a mono exposure. Second, when the dual exposure counter equals one (and the normal exposure counter is 2), it cannot be presumed that an unexposed frame is aligned with the secondary leans 30. For example, there exists the possibility that the two remaining unexposed frames are immediately adjacent to each other and thus, no unexposed frame is aligned with the secondary lens 30. To account for this possibility, the value of the flag f(n−1), which represents the exposure status of the frame immediately following the frame aligned with the primary lens 20, is determined. If the flag f(n−1) is not set, it is presumed that the frame immediately following the frame aligned with the primary lens 20 is unexposed and that dual exposure count of one is a false count. In this circumstance, the dual exposure counter is decrease by one and the flag D is cleared.

Preferably, the photographic system 10 is capable of writing magnetic information, for example, mono/stereo/burst exposure (if burst exposure, the time between exposures), exposure information, date, frame number, in connection with each frame on the film 100. As described earlier, the photographic system 10 includes a magnetic recording head 80. With reference to FIGS. 1 and 6, frame data is magnetically recorded as to a frame when the particular frame of film 100 is advanced such that the portion of frame capable of magnetically recording frame data is aligned with the magnetic recording head 80. For example, if a dual exposure action occurs, the frame data for the frame aligned with the primary lens 20 is magnetically recorded and the frame data for the frame aligned with the secondary lens is stored and alignment with the magnetic recording head 80 occurs.

As described above, the film 100 is generally advanced according to the exposure status of the next frame and the frame following the next frame. Thus, when the next frame has been exposed, the film 100 is advanced either two or three frames depending on whether the present exposure action is a mono or dual exposure. For example, if a dual exposure action occurs, the frame data for the frame aligned with the primary lens 20 is magnetically recorded and the frame data for the frame aligned with the secondary lens is stored until that frame is advanced such that alignment with the magnetic recording head 80 occurs. Thus, if the present exposure action is a mono exposure, the frame data for the mono exposure of the frame aligned with the primary lens 20 is magnetically recorded, the film 100 is advanced one frame and the stored frame data for the previous dual exposure action is magnetically recorded, and the film is then advanced another frame to align the next unexposed frame with the primary lens 20 for a further exposure action.

Figure 7:
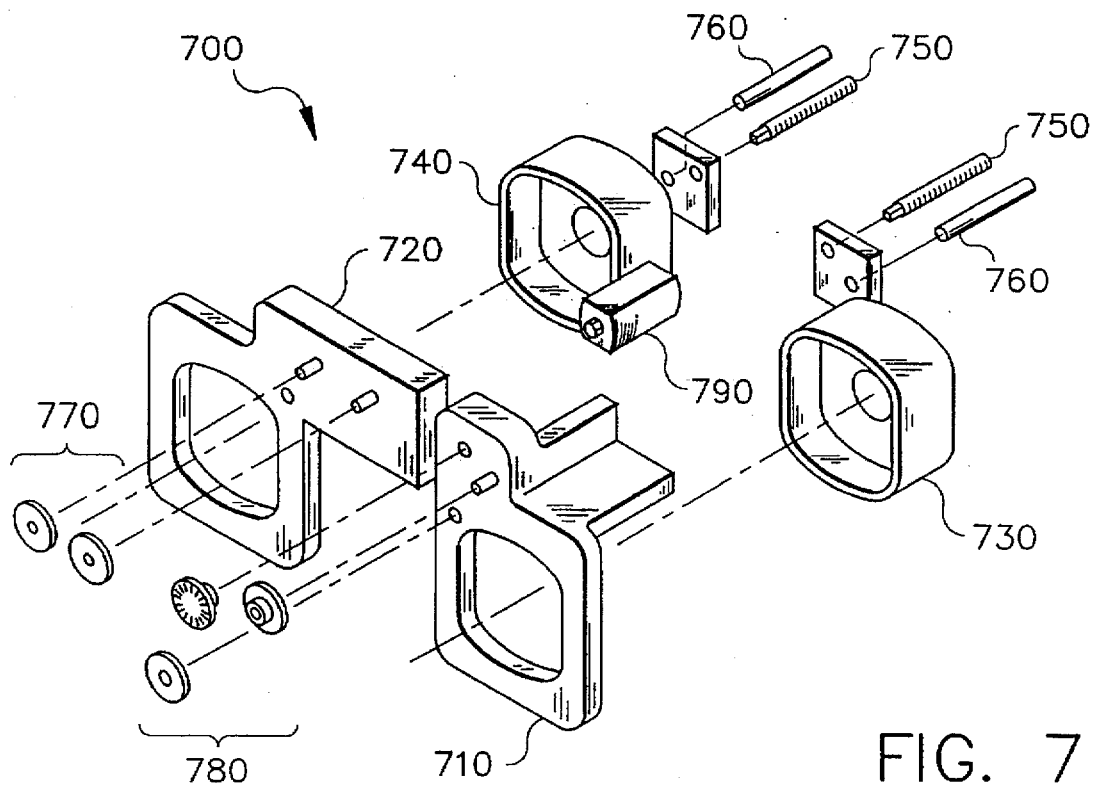
FIG. 7 is a perspective view of a motor drive for focusing the photographic system shown in FIG. 2.

The photographic system's 10 exposure control of the secondary shutter (not shown) can be identical to the control for the primary shutter (not shown). For example, in automatic applications, the primary shutter speed and focal length for the primary lens can be used for the secondary shutter speed and focal length for the secondary lens. Additionally, as shown in FIG. 7, a motor drive 700 can be used to focus the primary lens 20 and secondary lens 30. As shown in FIG. 7, the motor drive 700 comprises a primary lens mechanical plate 710, a secondary lens mechanical plate 720, primary lens shutter assembly 730, secondary lens shutter assembly 740, drive screws 750, guide shafts 760, transfer gears 770, focus drive gears 780 and focus motor 790. It should be noted that the stereo effect can still be produced if the primary lens 20 is focused differently than the secondary lens 30. Alternatively, the secondary lens 30 can be fixed on a predetermined focus. Alternatively, the primary lens 20 and secondary lens 30 can be provided with manual settings for the shutter speed, aperture and focus.

Figure 8:
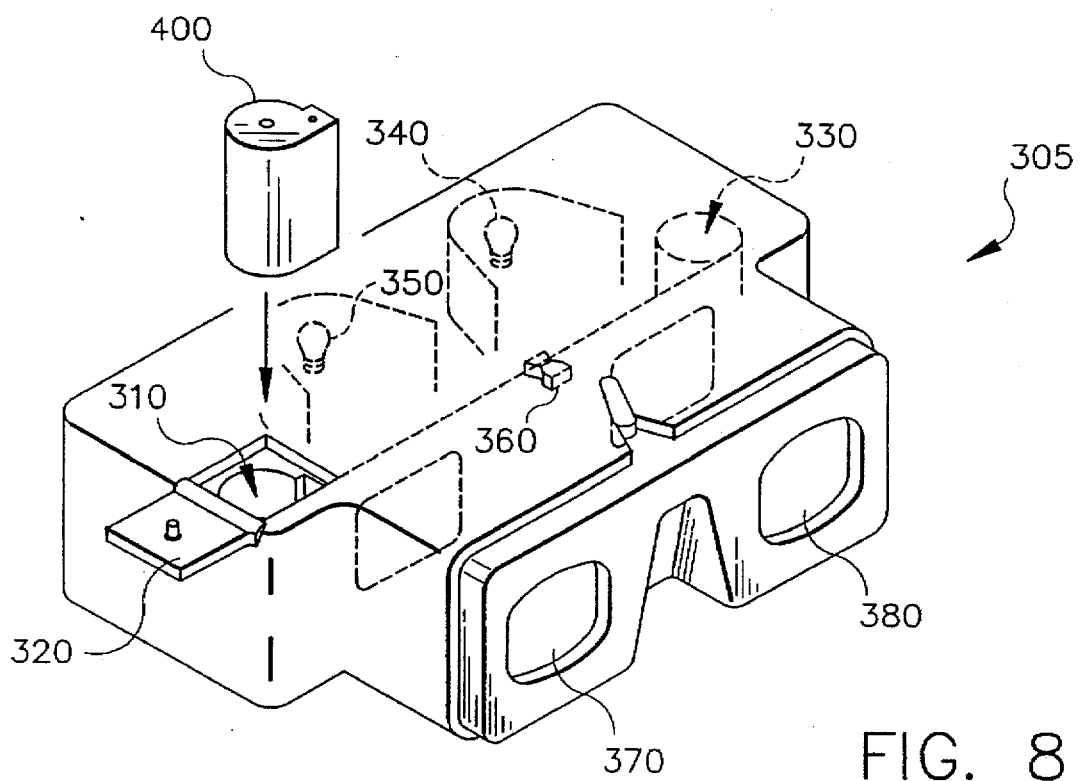
FIG. 8 is a perspective view of a photographic system capable of providing viewing of interspersed mono and dual images on processed film.

The method according to the present invention is also for use by a photographic system capable of allowing for the viewing of mono and stereo images on processed film. As shown in FIG. 8, a viewer 305 comprises a loading chamber 310, film door 320, film take-up chamber 330, a primary illumination bulb 340, a secondary illumination bulb 350, a magnetic recording head 360, a primary viewing lens 370, a secondary viewing lens 380 and the film viewing date 390. The film door 320 is moveable between opened and closed positions for uncovering and covering the opening of the loading chamber 310. A film cartridge 400, containing processed film, is loaded into the viewer 305 by inserting the film cartridge 400 into the loading chamber 310 and closing the film door 320. Upon closing the film door 320, the processed film (not shown) contained within the film cartridge 400 can be advanced from the film cartridge 400, across the film viewing gate 390 and into the film take-up chamber 330. Advancement of the film can occur automatically upon closing of the film door 320 or in response to a user's command. It should be appreciated that the film cartridge 400 is shown as a film cartridge requiring counter clockwise rotation to thrust film from the film cartridge. Preferably, the viewer 305 is a normal wind photographic system.

Figure 9:
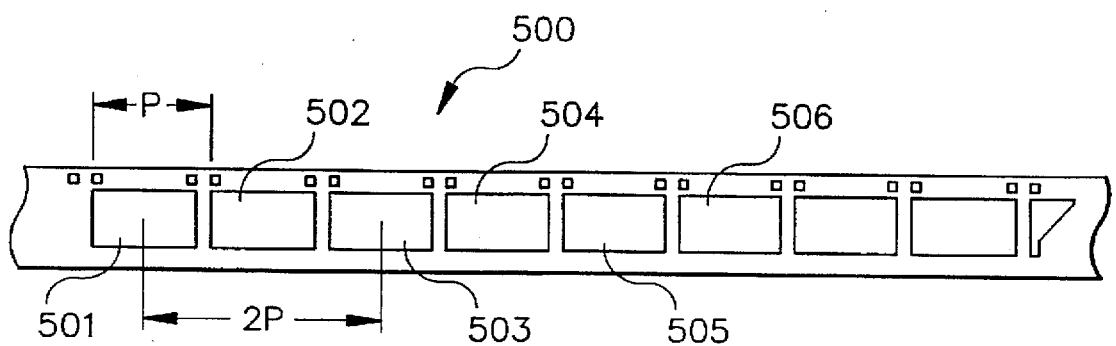
FIG. 9 is a view of frames on a strip of processed film.

With reference to FIGS. 8 and 9, when the film 500 is positioned ready for viewing, the film 500 extends from the film cartridge 400 across the film viewing gate 390 and is wound about the take-up spool (not shown) in the take-up spool chamber 330. Generally, a distance P separates each frame on the film 500, and on the other hand, the center focal line (not shown) of the primary viewing lens 370 and the center focal line (not shown) of the secondary viewing lens 380 are spaced the distance 2P. Thus, when the film 500 is viewing ready, a frame 501 of the film 500 is aligned with the primary viewing lens 370 and a frame 503 is aligned with the secondary viewing lens 380. Stereo images contained on the processed film can be transposed, i.e. the image on the frame 501 is viewable through the primary viewing lens 370 and the image on the frame 503 is viewable through the secondary viewing lens 380, by methods known to those skilled in the art and as described, for example, in the book entitled "The World of 3-D A practical guide to stereo photography" by Jac. G. Ferwerda, published by 3-D Book Productions, Borger, The Netherlands, 2nd Ed. 1987.

The viewer 305 is capable of advancing the film 500 to automatically allow for the viewing of interspersed mono and dual images (i.e., a viewing action). It should be noted that for purposes of viewing, burst images are treated as mono images. For example, the film 500 is newly loaded and the frame 501 constitutes the first frame of the film 500 and the frame 503 constitutes a third frame of the film 500. In the event, the frame 501 constitutes a mono image, only the primary illumination bulb 340 is illuminated to allow for the viewing of the frame 501 through the primary viewing lens 370. In the event the frame 501 is one of stereo pair images, the primary illumination bulb 340 and the secondary illumination bulb 350 are illuminated to allow for the viewing of the stereo image through the primary viewing lens 370 and the secondary viewing lens 380. The viewer 305 also includes a device (e.g. an advancement button) (not shown) for initiating another viewing action by advancing the film 500.

Regardless of whether a mono image or stereo image are viewed, the film 500 is advanced one frame and, as a result, the frame 502 is aligned with the primary viewing lens 370 and the frame 504 is aligned with the secondary viewing lens 380. Following the first viewing action, the film 500 is advanced according to whether the next frame has been viewed and whether the frame following the next frame has been previously viewed. For example, if the first viewing action is a mono image and the second viewing action is another mono image, only the frame 502 will be viewed and the film 500 is advanced one frame to align the next unviewed frame, i.e., frame 503, for viewing through the primary viewing lens 370. If the first viewing action is a mono image and the second viewing action is a stereo image, the frame 502 and the frame 504 will be viewed and the film 500 is advanced one frame to align the next unviewed frame, i.e., frame 503, for viewing through the primary viewing lens 370. If the first viewing action was a stereo image and the second viewing action is a mono image, the frame 503 will be viewed and the film 500 is advanced two frames to align the next unviewed frame, i.e., frame 504, for viewing through the primary viewing lens 370. If the first viewing action was a stereo image and the second viewing action is a stereo image, the frame 503 and the frame 505 will be viewed and the film 500 is advanced three frames to align the next unviewed frame, i.e., frame 506, for viewing through the primary viewing lens 370. It should be noted that whenever the film 500 is advanced, a stereo image is always aligned for viewing through the primary viewing lens 370 and the secondary viewing lens 380, or, if a mono image, the mono image is aligned for viewing through the primary viewing lens 370.

Generally, when the next frame has not been viewed, the film 500 will be advanced one frame regardless of the present viewing action is a mono image or stereo image. When the next frame has been previously viewed, the film 500 will be advanced either two frames or three frames depending on whether the present viewing action is a mono image or stereo image. For example, if the next frame has been viewed and the present viewing action is a mono image, the film 500 is advanced two frames to align the next unviewed frame, for viewing through the primary viewing lens 370. If the next frame has been viewed and the present viewing action is a stereo image, the film 500 is advanced three frames to align the next unviewed frame, for viewing through the primary viewing lens 370.

Figure 10A:
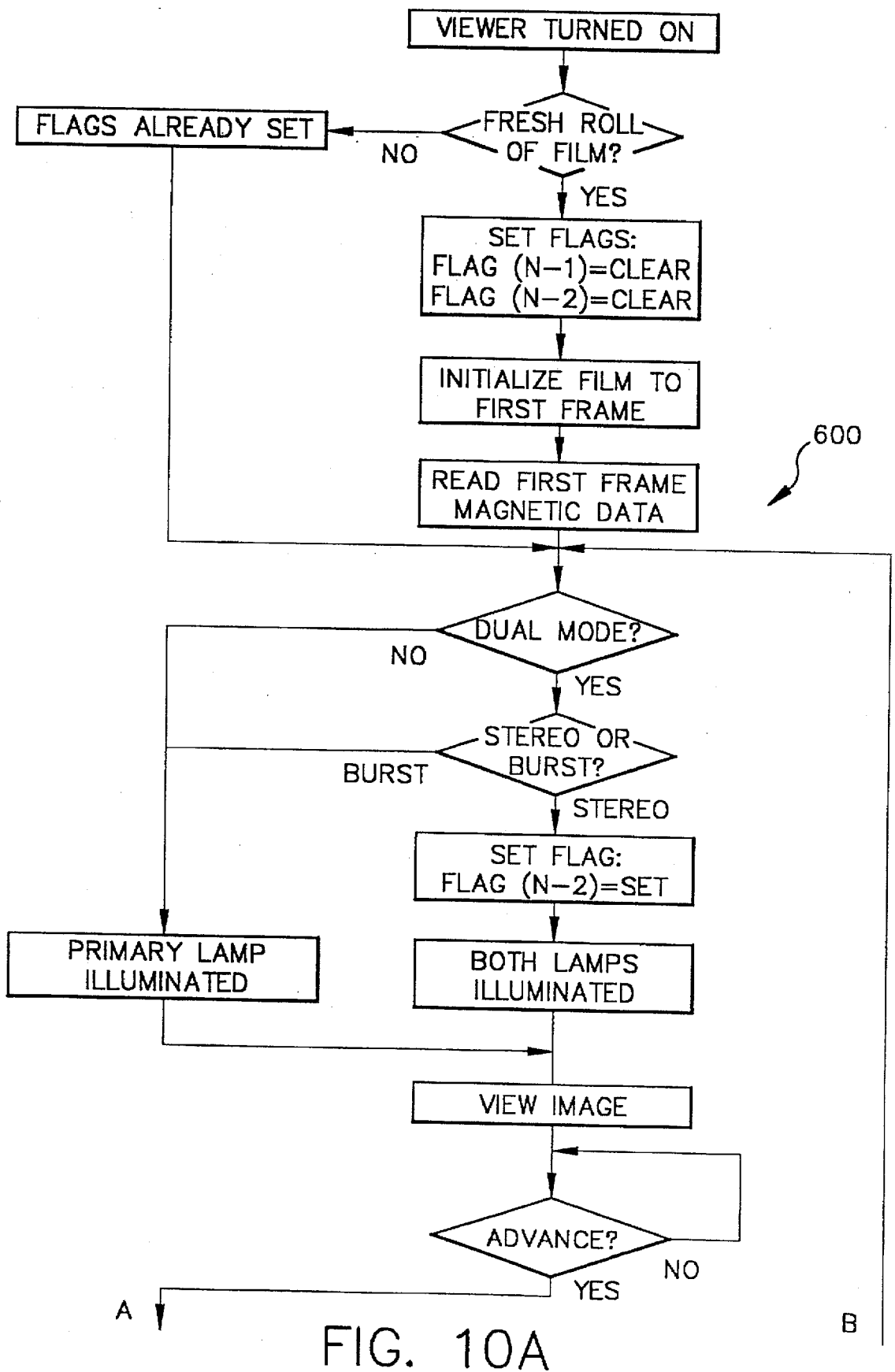
FIGS. 10A and 10B are block diagrams of a control process for use by the photographic system shown in FIG. 8.
Figure 10B:
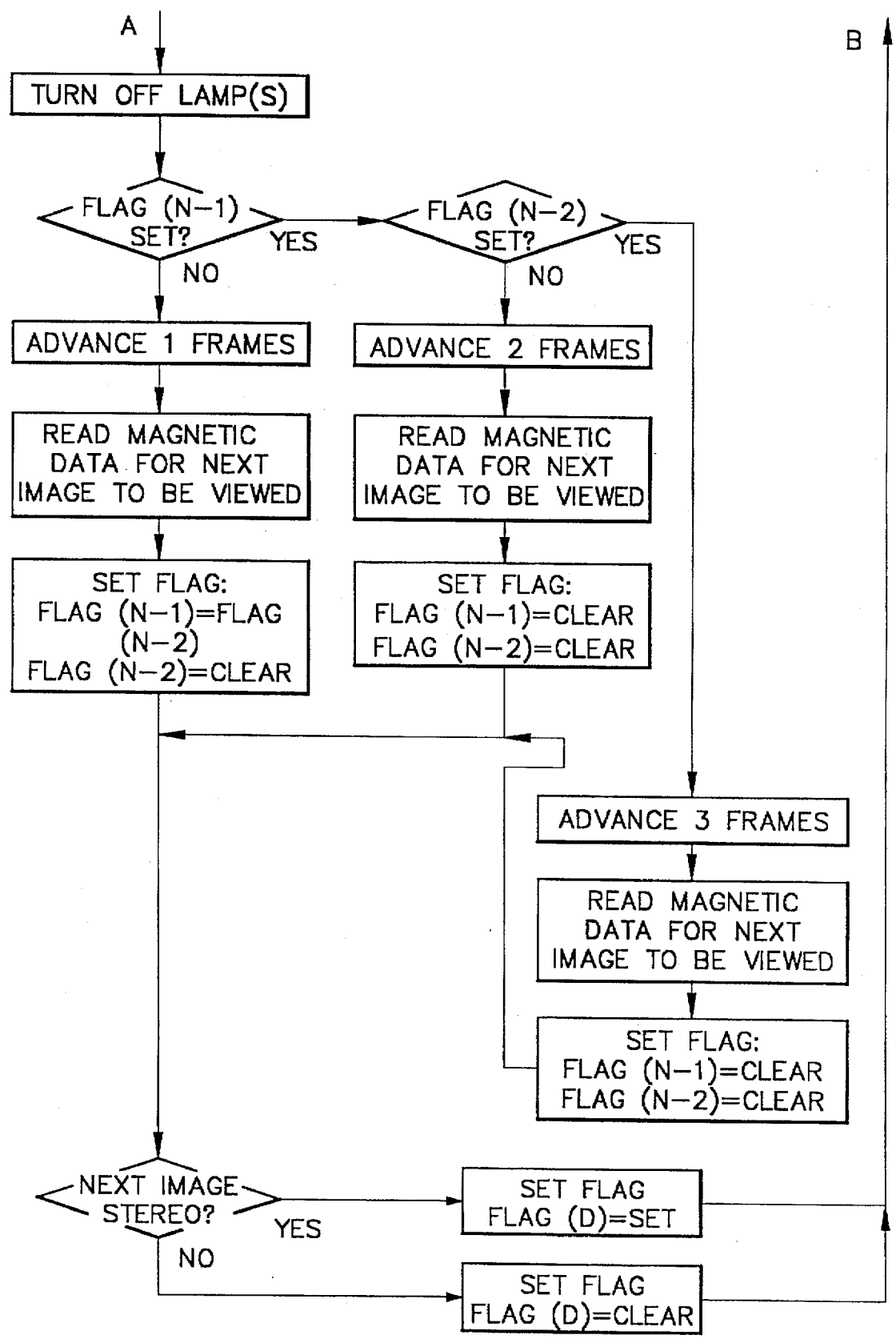

A method according to the present invention for use with a viewer 305 to automatically advance the film 500 containing interspersed mono and stereo images is shown as a process 600 in FIG. 10. The process 600 tracks whether the next frame has been viewed, designated by a flag f(n−1), and whether the frame following the frame has been viewed, designated by a flag f(n−2). For example, with reference to FIGS. 8 and 9, when the frame 501 is aligned with the primary viewing lens 370, flag f(n−1) represents whether the frame 502 has been previously viewed, and the flag f(n−2) represents whether the frame 503 is presently viewable through the secondary viewing lens 380 (i.e. the secondary illumination bulb 350 is illuminated). Based on whether f(n−1) and/or f(n−2) are set (e.g., assigned a value of 1), the film 500 is advanced either one, two or three frames in response to initiation of another viewing action.

The process 600 can be initiated when the viewer 305 is turned on. Upon initiation, the values of the flags f(n−1) and f(n−2) are determined. If the film 500 is newly loaded, it is presumed that none of the frames of the film 500 have been viewed and the flags f(n−1) and f(n−2) are cleared (e.g., assigned a value of zero). Next, the viewer 305 is ready for viewing by a user. If the frame aligned for viewing through the primary viewing lens 380 is part of a stereo image, both the primary illumination bulb 340 and the secondary illumination bulb 50 are illuminated and the flag f(n−2) is set. The setting of the flag f(n−2) indicates the frame aligned for viewing through the secondary viewing lens 390 is being viewed. Alternatively, if the frame aligned for viewing through the primary viewing lens 380 is a mono image, only the primary illumination bulb 340 is illuminated and the value of the flags f(n−1) and f(n−2) are not changed because neither the next frame or the frame aligned with the secondary viewing lens 380 have been viewed. Regardless of whether a mono image or a stereo image has been viewed, the value of the flag f(n−1) is next determined. If the flag f(n−1) is not set, the next frame is presumed to not have been viewed and the film 500 is advanced one frame to align the next unviewed frame for viewing through the primary viewing lens 370.

Alternatively, if the flag f(n−1) is set, and the next frame is presumed to have been viewed and the viewing status of the frame following the next frame, i.e., flag f(n−2), is next determined. If the flag f(n−2) is not set, the frame following the next frame is presumed to not have been viewed and the film 500 is advanced two frames to align the next unviewed frame for viewing through the primary viewing lens 370 and the flag f(n−1) and flag f(n−2) are cleared. Finally, if the flag f(n−2) is set, the frame following the next frame is presumed to have been viewed, the film 500 is advanced three frames to align the next unviewed frame for viewing through the primary viewing lens 370 and the flags f(n−1) and f(n−2) are cleared.

Preferably, the viewer 305 is capable of reading magnetic information, for example, mono/stereo/burst exposure, in connection with each frame on the film 500. As described earlier, the viewer 305 includes a magnetic recording head 360. Thus, to determine whether the image to be viewed is a mono image or stereo image, the magnetic information with regard to the frame aligned for viewing through the primary viewing lens 370 can be read. Additionally, other frame data can be read and viewed in connection with viewing the mono image or stereo image.

The foregoing description of the present invention has been presented for purposes of illustration and description. The description is not intended to limit the invention to the form disclosed herein. Consequently, the invention and modifications commensurate with the above teachings and skill and knowledge of the relevant art are within the scope of the present invention. The preferred embodiment described above is also intended to explain the best mode known of practicing the invention and to enable others skilled in the art to utilize the invention in various embodiments and with the various modifications required by their particular applications for use of the invention. It is intended that the appended claims be construed to include all alternative embodiments as permitted by the prior art.

| Parts List For FIGS. 1–10: | |
|---|---|
| 10 | photographic system |
| 20 | primary lens |
| 30 | secondary lens |
| 40 | loading chamber |
| 50 | film door |
| 60 | film take-up chamber |
| 70 | film exposure gate |
| 80 | magnetic recording head |
| 90 | film cartridge |
| 100 | film |
| 101 | frame on film |
| 102 | film frame following frame 101 |
| 103 | film frame following frame 102 |
| 104 | film frame following frame 103 |
| 105 | film frame following frame 104 |
| 106 | film frame following frame 105 |
| 107 | film frame following frame 106 |
| 201 | fourth to last frame on film |
| 202 | third to last frame on film |
| 203 | second to last frame on film |
| 204 | last frame on film |
| 300 | process for use by photographic system 10 |
| 305 | viewer |
| 310 | loading chamber |

-continued

| Parts List For FIGS. 1–10: | |
|---|---|
| 320 | film door |
| 330 | film take-up chamber |
| 340 | primary illumination bulb |
| 350 | secondary illumination bulb |
| 360 | magnetic recording head |
| 370 | primary viewing lens |
| 380 | secondary viewing lens |
| 390 | film viewing gate |
| 400 | film cartridge containing processed film |
| 500 | processed film |
| 501 | frame on processed film |
| 502 | film frame following frame 501 |
| 503 | film frame following frame 502 |
| 504 | film frame following frame 503 |
| 505 | film frame following frame 504 |
| 506 | film frame following frame 505 |
| 600 | process for use by viewer 305 |
| 700 | motor drive |
| 710 | primary lens mechanical plate |
| 720 | secondary lens mechanical plate |
| 730 | primary lens shutter assembly |
| 740 | secondary lens shutter assembly |
| 750 | drive screw |
| 760 | guide shaft |
| 770 | transfer gear |
| 780 | focus drive gear |
| 790 | focus motor |

What is claimed is:

1. A method for interspersing mono and dual images on frames of photographic film, said method for use with a photographic system capable of producing either mono or dual exposures on previously unexposed frames of the photographic film in accordance with whether the photographic system is preset to operate in the mono exposure mode or dual exposure mode, wherein the photographic system is capable of producing a single exposure on a primary frame of the photographic film in the mono exposure mode, wherein the photographic system is further capable of producing dual exposures on the primary frame and a secondary frame of the photographic film in the dual exposure mode, wherein the primary frame and secondary frame are separated by one frame of film, the photographic system capable of tracking the exposure status of the frame following the primary frame and the secondary frame, said method providing for the advancement of the photographic film after an exposure is initiated to position unexposed frames on the photographic film for further mono or dual exposures, said method comprising the steps of:

(a) advancing the photographic film one frame when the frame following the primary frame is unexposed;

(b) advancing the photographic film two frames when the frame following the frame is exposed and, the secondary frame is unexposed;

(c) advancing the photographic film three frames when the frame following the primary frame is exposed and the secondary frame is exposed.

2. A method as claimed in claim 1, wherein said photographic system is capable of maintaining a frame count of unexposed frames on said photographic film, said method further comprising the steps of:

(d) decreasing the frame count by one when the photographic film is advanced one frame;

(e) decreasing the frame count by two when the photographic film is advanced two frames; and (f) decreasing the frame count by three when the photographic film is advanced three frames.

3. A method as claimed in claim 1, wherein said photographic system is capable of storing magnetic data on said photographic film, and wherein said steps of advancing the photographic system further comprise magnetically recording frame data as to particular frames during advancement of each frame.

4. A method for interspersing dual images and mono images on photographic film, said method for use with a photographic system capable of exposing previous unexposed photographic film, said photographic system capable of producing dual images by simultaneously exposing two frames on said photographic film in the dual exposure operation mode or mono images by exposing one frame on said photographic film in the mono exposure operation mode, said photographic system capable of tracking a first flag and a second flag, both of which are cleared upon initial loading of the photographic film, said method comprising the steps of:

(a) upon activation of an exposure action determining the photographic system's exposure operation mode;

(b) upon determining the exposure operation mode to be the dual exposure mode, simultaneously exposing two frames of photographic film, said two frames separated by at least single frame;

(c) setting the second flag when said exposure action occurred in the dual exposure mode;

(d) upon determining the operation mode not to be the dual exposure mode, exposing one frame of the photographic film;

(e) upon determining that the first flag is clear, advancing the photographic film one frame, and assigning the value of the second flag to the first flag and clearing the second flag;

(f) upon determining that the first flag is set and the second flag is clear, advancing the photographic film two frames and clearing the first flag; and (g) upon determining that the first flag is set and the second flag is set, advancing the photographic film three frames and clearing the first flag and the second flag.

5. A method as claimed in claim 4, wherein said photographic system is capable of maintaining a frame count of unexposed frames on said photographic film, said method further comprising the steps of:

(h) decreasing the frame count by one when the photographic film is advanced one frame;

(i) decreasing the frame count by two when the photographic film is advanced two frames; and (j) decreasing the frame count by three when the photographic film is advanced three frames.

6. A method as claimed in claim 5, wherein said step of simultaneously exposing two frames of photographic film further comprises preventing said exposure action from occurring when the frame count is less than three.

7. A method as claimed in claim 5, wherein upon determining that the frame count is less that three, said step of simultaneously exposing two frames of photographic film further comprises preventing said exposure action from occurring unless the frame count is two and the second flag is not set.

8. A method as claimed in claim 5, wherein upon determining that the frame count is less than three, said step of simultaneously exposing two frames of photographic film further comprises preventing said exposure action from occurring unless the frame count is two and the first flag is set.

9. A method as claimed in claim 5, wherein said photographic film is housed in a film cartridge and said method further comprises the step of:

(k) automatically rewinding the photographic film into the film cartridge when the frame count is zero.

10. A method for advancing photographic film containing processed mono and dual images on frames of photographic film, said method for use with a photographic system capable of displaying for a user's viewing the mono image or dual images on said photographic film, said photographic system capable of tracking a first flag and a second flag, both of which are cleared upon initial loading of the photographic film, said method comprising the steps of:

(a) upon determining the image to be displayed is a dual image, simultaneously displaying for viewing by a user the two frames of photographic film containing the dual image, and setting the second flag;

(b) upon determining the image to be displayed to be a mono image, displaying said mono image;

(c) upon activation of another viewing action and determining that the first flag is clear, advancing the photographic film one frame and assigning the value of the second flag to the first flag and clearing the second flag;

(d) upon activation of a viewing action and determining that the first flag is set and the second flag is clear, advancing the photographic film two frames and clearing the first flag; and (e) upon activation of another viewing action and determining that the first flag is set and the second flag is set, advancing the photographic film three frames and clearing the first flag and the second flag.

* * * * *